United States Patent
Supalov

(10) Patent No.: US 7,856,348 B2
(45) Date of Patent: Dec. 21, 2010

(54) SYSTEM AND METHOD FOR GENERATION OF SYNTHETIC PARALLEL APPLICATION KERNELS USING TRACING INFORMATION

(75) Inventor: Alexander V. Supalov, Erftstadt (DE)

(73) Assignee: Intel Corporation, Santa Clara, CA (US)

( * ) Notice: Subject to any disclaimer, the term of this patent is extended or adjusted under 35 U.S.C. 154(b) by 506 days.

(21) Appl. No.: 11/984,249

(22) Filed: Nov. 15, 2007

(65) Prior Publication Data

US 2009/0132223 A1    May 21, 2009

(51) Int. Cl.
G06F 9/44     (2006.01)
G06F 13/10    (2006.01)
G06F 13/12    (2006.01)
G06F 11/00    (2006.01)

(52) U.S. Cl. .......................... 703/21; 714/38
(58) Field of Classification Search ................... 703/21; 717/135, 140; 714/38
See application file for complete search history.

(56) References Cited

U.S. PATENT DOCUMENTS

| | | | |
|---|---|---|---|
| 2002/0080784 A1 | 6/2002 | Krumel | |
| 2002/0165838 A1* | 11/2002 | Vetter | 706/20 |
| 2006/0230317 A1* | 10/2006 | Anderson | 714/38 |
| 2007/0058547 A1* | 3/2007 | Berstis | 370/232 |
| 2008/0184214 A1 | 7/2008 | Archer et al. | |
| 2008/0316926 A1 | 12/2008 | Zhao et al. | |
| 2009/0129277 A1 | 5/2009 | Supalov et al. | |

OTHER PUBLICATIONS

Office Action of U.S. Appl. No. 11/984,322, mailed on Sep. 29, 2009.

* cited by examiner

*Primary Examiner*—Dwin M Craig
(74) *Attorney, Agent, or Firm*—Pearl Cohen Zedek Latzer, LLP

(57) ABSTRACT

A method and apparatus may automatically generate a synthetic kernel application for use in optimizing applications on a parallel computing system using protocols such as MPI. The method and system may collect trace communication data from nodes within the parallel computing system running a given application. This trace communication data, which may include function calls and arguments, data size and type, and origin and destination nodes, may be used to calculate processor load along a time axis for each node. A synthetic kernel generator may generate instructions simulating processor load using this communication data. The synthetic kernel generator may also generate instructions to recreate the pattern of node communication with meaningless data, based on the trace communication data. Both types of instructions may then be automatically compiled to form a single synthetic kernel which simulates the behavior of the original application. Other embodiments are described and claimed.

12 Claims, 3 Drawing Sheets

SYSTEM AND METHOD FOR GENERATION OF SYNTHETIC PARALLEL APPLICATION KERNELS USING TRACING INFORMATION

BACKGROUND OF THE INVENTION

Parallel computing systems with distributed memory are generally made up of many nodes, each of which is capable of performing data computation independently of the other nodes. Applications written to exploit this parallelism distribute their workload across multiple nodes in distinct processes. In such situations, nodes generally need to communicate with other nodes to share data. To achieve this sharing of data, a communication protocol is used.

MPI, or Message Passing Interface, is a type of language-independent communications protocol used to program parallel computers. MPI is not sanctioned by any major standards body; nevertheless, it has become the de facto standard for communication among processes that model a parallel program running on a distributed memory system. Actual distributed memory supercomputers such as computer clusters often run these programs. MPI is a specification, not an implementation. MPI has Language Independent Specifications (LIS) for the function calls and language bindings. The implementation language for MPI is different in general from the language or languages it seeks to support at runtime. Most MPI implementations are done in a combination of C, C++ and assembly language, and target C, C++, and Fortran programmers. However, the implementation language and the end-user language are in principle always decoupled.

One challenge faced by those attempting to tune the performance of a specific application using an MPI library is obtaining a representative application kernel, workload, or part thereof. Likewise, debugging works best when a small but representative program (a so called reproducer) is available to the investigative developer.

Unfortunately, more often than not, either applications, workloads, or both are either sensitive, or cannot be used without a special and very expensive license, or cannot be provided to the MPI development team for export control reasons. Likewise, generation of a debugging reproducer requires deep understanding of the application internals. This is very time consuming or outright impossible if the original developer is unavailable. Moreover, even when the reproducer is written, it may not be shared with the external parties for reasons mentioned above. Any of this makes reproduction of the computational and communication load impossible on machines that are not licensed to run the respective application.

BRIEF DESCRIPTION OF THE DRAWINGS

The subject matter regarded as the invention is particularly pointed out and distinctly claimed in the concluding portion of the specification. The invention, however, both as to organization and method of operation, together with objects, features, and advantages thereof, may be best understood by reference to the following detailed description when read with the accompanied drawings in which:

DETAILED DESCRIPTION OF THE INVENTION

In the following detailed description, numerous specific details are set forth in order to provide a thorough understanding of the invention. However it will be understood by those of ordinary skill in the art that the present invention may be practiced without these specific details. In other instances, well-known methods, procedures, components and circuits have not been described in detail so as not to obscure the present invention.

Unless specifically stated otherwise, as apparent from the following discussions, it is appreciated that throughout the specification discussions utilizing terms such as "processing," "computing," "calculating," "determining," or the like, refer to the action and/or processes of a computer, processor, or computing system, or similar electronic computing device, that manipulates and/or transforms data represented as physical, such as electronic, quantities within the computing system's registers and/or memories into other data similarly represented as physical quantities within the computing system's memories, registers or other such information storage, transmission or display devices. In addition, the term "plurality" may be used throughout the specification to describe two or more components, devices, elements, parameters and the like.

It should be understood that the present invention may be used in a variety of applications. Although the present invention is not limited in this respect, the circuits and techniques disclosed herein may be used in many apparatuses such as personal computers, network equipment, stations of a radio system, wireless communication system, digital communication system, satellite communication system, and the like.

Devices, systems and methods incorporating aspects of embodiments of the invention are also suitable for computer communication network applications, for example, intranet and Internet applications. Embodiments of the invention may be implemented in conjunction with hardware and/or software adapted to interact with a computer communication network, for example, a personal area network (PAN), LAN, wide area network (WAN), or a global communication network, for example, the Internet.

Embodiments of the invention may include a computer readable storage medium, such as for example a memory, a disk drive, or a "disk-on-key", including instructions which when executed by a processor or controller, carry out methods disclosed herein.

Figure 1:
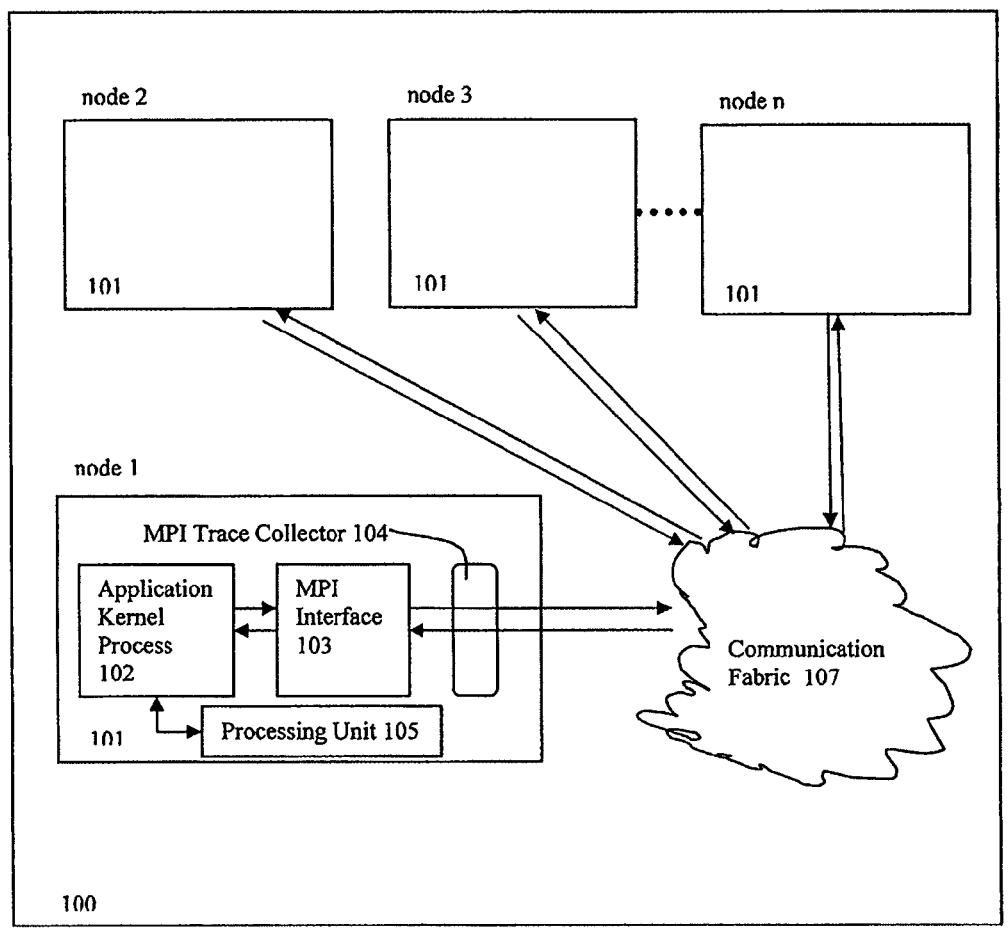
FIG. 1 is a block diagram showing a parallel computer system for use with an embodiment of the present invention.

In FIG. 1, parallel computing system 100 according to an embodiment of the present invention is depicted. The system includes a series of nodes 101 connected by communication fabric 107. Each node 101 may include for example processing unit 105 which may be, for example, a single processor or controller, or a group of processors or processor cores sharing a common volatile memory and/or non-volatile data store. Processing unit 105 may be used to run some or all executable processes on that node, including MPI Interface 103 and MPI Trace Collector 104.

Each node is tasked with running an application kernel process 102, which is generally a single process within a larger application running on the entire parallel computing system 100. Each application kernel process 102 performs a fraction of the total application workload. To achieve this, each node 101 may require data from other nodes, or may need to transmit its processed data output to other nodes.

To communicate with processes running in other nodes, application kernel process 102 may employ MPI interface 103. Generally, MPI interface 103 is implemented as a library, such as the Intel® MPI Library, which may employ specialized function calls to pass data between processes. The MPI library may then be linked in at compile time into the application binary, although virtual machines and interpreters may be used as functional equivalents, as is well known in the computer arts. MPI interface 103 may also support a shared memory environment within and across nodes. Other methods of implementing inter-node communications may be used, and an MPI interface need not be implemented as a library.

MPI Trace Collector 104 may capture and store information trace communication data or other data about MPI interface 103 usage, such as a time stamp, size, and origin and/or destination node for transferred data. MPI Trace Collector 104 may also capture such data as the data type transferred, the exact MPI library function called, the arguments to these function calls, as well as other data. MPI Trace Collector 104 may be implemented as an extension to MPI interface 103 as additional functions in an MPI library, or may employ a separate compiled program. MPI Trace Collector 104 may also be embedded in hardware, and capable of physically interfacing with parallel computing system 103.

To pass data between nodes 101, MPI interface 103 may send messages, for example, over communication fabric 107, which links nodes to each other and to common data stores (not shown). Communication fabric 107 may employ any type of inter-node communication system, including hierarchical switched network designs such as Ethernet, switched fabric topologies such as InfiniBand® or Fibre Channel, or a combination of such technologies.

MPI performance optimization and debugging do not require the real application or the workload. They merely require a faithful representation of the computational and communicational load imposed by the application on the parallel system.

Figure 2:
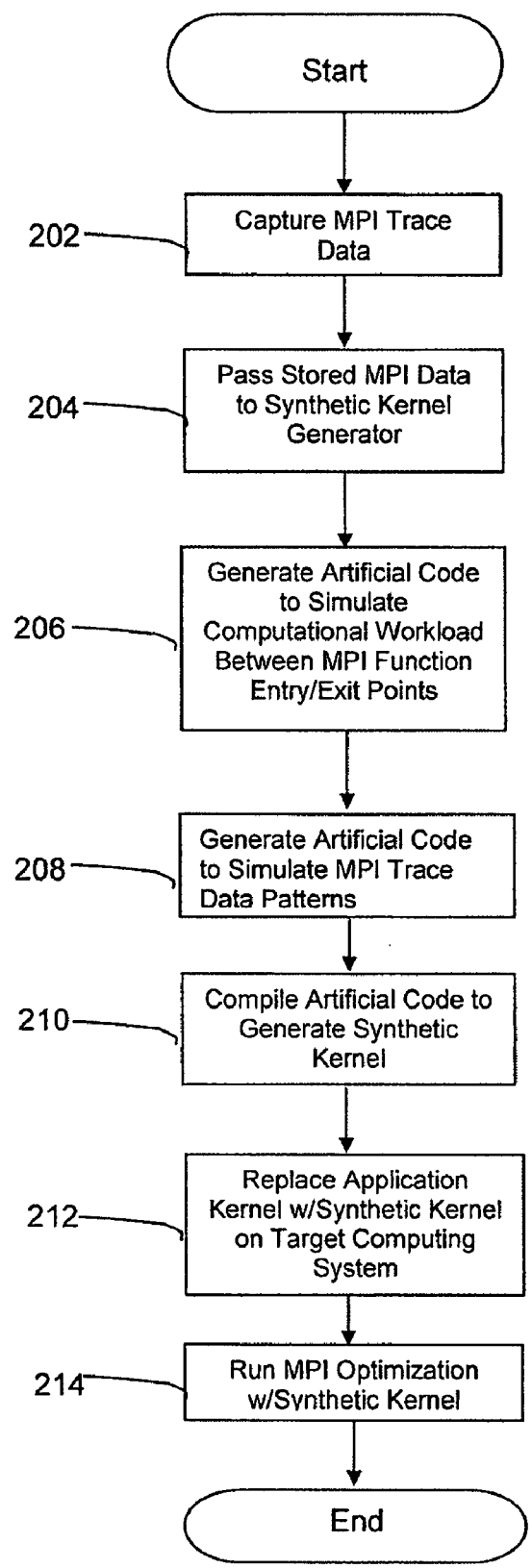
FIG. 2 is a flow chart outlining the operations of creating and using a synthetic application kernel according to an embodiment of the present invention.

FIG. 2 is a flowchart showing the process by which a synthetic application kernel may be generated through the use of MPI Trace Collector 104 data.

In operation 202, MPI Trace Collector 104 may capture and store MPI data from an instance of an application on a given run. The MPI data is of the type noted herein for a series of points along a time axis. This MPI data may be stored on each individual node, or may also consolidated at a central node (or data store) while application kernel 102 is executing within each node 101.

In operation 204, the MPI data stored in operation 202 may passed to the synthetic kernel generator 303. According to one embodiment of the present invention shown in FIG. 3, the synthetic kernel generator 303 is preferably a computer program capable of running on any processor or machine such as machine 300 (FIG. 3), but may also be a dedicated hardware device. Synthetic kernel generator 303 need not run on any node 101 within parallel computing system 100, and may be run at an offsite testing facility while the application kernel is still running on parallel computing system 100.

In operation 206, the synthetic kernel generator parses the stored MPI data to determine when a particular node passes or receives data to/from another node. By analyzing this data, synthetic kernel generator 303 can determine the amount of time the application kernel process is being processed by a node before requiring data from another node. Thus, synthetic kernel generator 303 can calculate the processor load of any given node 101 at any time, or for a series of points along a time axis. For MPI optimization purposes, the actual instructions executed by a node are irrelevant, only the processor load is needed. In some embodiments, the application can be simulated by substituting the application process code with processor "busy work"—that is, a mix of integer and floating point operations which reproduces the processor utilization level and process time in the original application. This processor "busy work" should be carefully designed such that no compiler optimizations are possible, which would create a synthetic application kernel that did not simulate the original application. A good example of such "busy work" is a computational loop performing some computationally intensive operation (such as for example the dot product of two long vectors), the result of which is apparently used after the loop to prevent the loop from being optimized out by the compiler.

In operation 208, synthetic kernel generator 303 may analyze the MPI trace data to automatically generate computer instructions to approximate or simulate the pattern of communication data over communication fabric 107 between nodes 101. The communication pattern approximating part of the synthetic kernel may be mapped onto the respective MPI calls, the entry and exit points of which, as well as the data layout and other communication parameters, were captured during tracing. However, the synthetic application kernel need not use any of the actual data processed by the original application kernel, nor does it need any of the original application code, both of which may be proprietary or confidential.

In operation 210, synthetic kernel generator 303 may take the generated "busy work" instructions and instructions approximating the pattern of communication data to automatically compile a synthetic kernel which may simulate the application, for example, by: (i) ensuring that each node 101 has a similar utilization level at approximately the same time as that of the original application, (ii) ensuring that the pattern of data passed between nodes is similar to that of the original application, with respect to such characteristics as data type, data size, time sent and received, and origin node and destination node. Special care should be taken to ensure proper memory allocation and deallocation for the communication buffers used by the synthetic kernel.

In operation 212, the synthetic kernel is installed onto parallel computing system 100, or onto a separate computing system of similar design. The synthetic kernel can be brought to another computing system and may properly represent the original application, provided the artificial computational part is sound or properly scaled (e.g., using the processor frequency ratio on the original and target platforms). Note that the eventual differences in the networking hardware or other parts of the system may be naturally accommodated thanks to the full and precise representation of the communication patterns captured in the MPI trace data. A synthetic kernel according to some embodiments of the present invention, may be capable of reproducing the original application on any machine, and thus may make it an ideal tool for performance modeling.

In operation 214, the synthetic kernel may be run and used to optimize MPI. The artificial kernel, being a source code program, can be rebuilt over another MPI implementation to analyze the possible dependency of the observed issue on a particular MPI implementation. Other well established MPI debugging techniques can be used on the synthetic kernel as if it were the original application.

Note that the MPI tracing libraries are supported by the MPI standard through a universal profiling interface. Thus, some embodiments of the present invention may be applicable to any MPI implementation, and hence, to applications that were built with any MPI implementation. As a consequence, it may not be necessary to have an application ported to specific implementations of communication protocols such as Intel® MPI Library in order to generate the respective artificial kernel.

Artificial kernels, according to some embodiments of the present invention, can be used for optimizing the platform or MPI characteristics (e.g. network driver settings, MPI optimization parameters like process placement and binding, point-to-point protocol thresholds, collective operation algorithms and their switch points, etc.). Of course, this synthetic kernel generation technique is transferable to any other field where tracing information can be generated.

Additionally, there may be no need to create the tracing files or store the intercepted communication data for further use—the recoding of the synthetic kernel or the use of this information can sometimes be done as tracing information is captured and analyzed.

Figure 3:
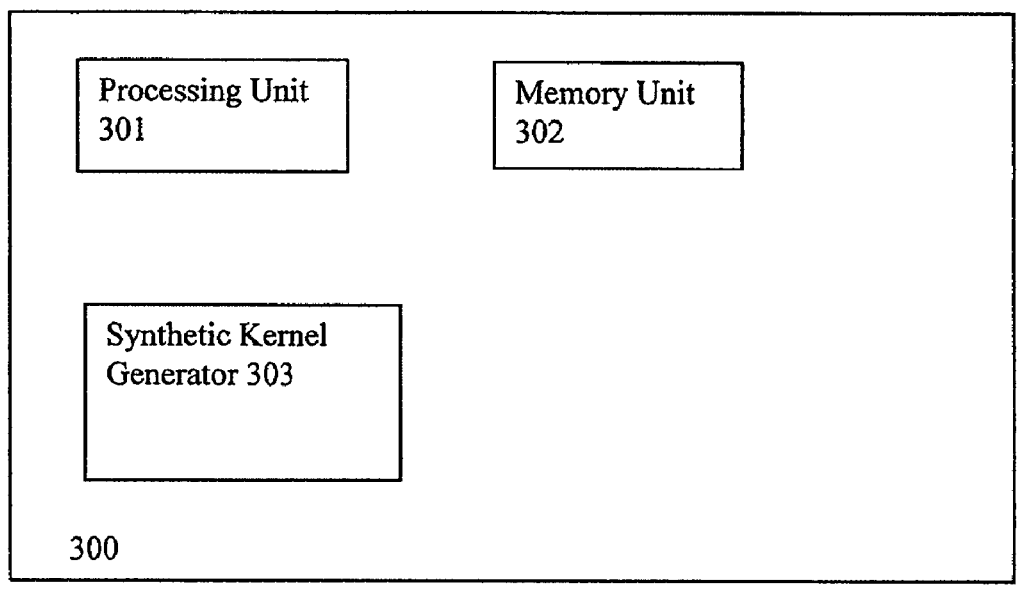
FIG. 3 is a block diagram showing an embodiment of a system implementing a synthetic kernel generator according to one embodiment of the invention.

FIG. 3 is a schematic diagram depicting a system capable of implementing a synthetic kernel generator is described according to one embodiment of the invention. System 300 may include, for example, one or more controllers or processing unit(s) 301, memory unit 302, which may include, for example, volatile and/or non-volatile data storage, and synthetic kernel generator 303. As noted herein, synthetic kernel generator 303 is preferably implemented as a set of computer executable instructions, but may also be embodied in another manner such as in a dedicated circuit, a dedicated device, or chip optimized for that purpose. Alternatively, synthetic kernel generation may be achieved with a discrete hardware unit capable of interfacing with a parallel computing system and may be capable of consolidating or eliminating a processing unit 301, memory unit 302, and synthetic kernel generator 303.

The present invention has been described with certain degree of particularity. Those versed in the art will readily appreciate that various modifications and alterations may be carried out without departing from the scope of the following claims:

The invention claimed is:

1. A method for automatically generating a synthetic kernel comprising:
   intercepting trace communication data from an instance of an application running on a parallel computing system comprising a plurality of nodes;
   calculating the processor load for each node in the parallel computing system on a time axis from the trace communication data;
   generating computer instructions to simulate the processor load of the application for each node on the time axis;
   generating computer instructions to simulate the communication pattern of the application between the nodes on the time axis and;
   compiling the computer instructions to simulate the processor load and the computer instructions to simulate the communication pattern into the synthetic kernel.

2. The method of claim 1, further comprising:
   storing the trace communication data in a computer readable medium.

3. The method of claim 1, wherein the trace communication data is MPI trace data.

4. The method of claim 3, wherein the MPI trace data is comprised of at least two elements of the following group: type of MPI function call, origin and destination node, data type transmitted/received, size of data transmitted/received, other MPI function arguments, and time of MPI function call.

5. The method of claim 1, wherein the trace communication data used to calculate the processor load for each node in the parallel computing system includes time information for each transmission in inter-node communication.

6. An apparatus for generating a synthetic kernel comprising:
   a controller to:
   trace communication data from an instance of an application running on a parallel computing system containing a plurality of nodes;
   calculate the processor load for each node in the parallel computing system on a time axis from the trace communication data;
   generate computer instructions to simulate the processor load of the application for each node on the time axis;
   generate computer instructions to simulate the communication pattern of the application between the nodes on the time axis and;
   compile the computer instructions to simulate the processor load and the computer instructions to simulate the communication pattern into the synthetic kernel.

7. The apparatus of claim 6, wherein the controller is to further:
   store the trace communication data is stored in a computer readable medium.

8. The apparatus of claim 6, wherein the trace communication data is MPI trace data.

9. The apparatus of claim 8, wherein the MPI trace data is comprised of at least two of the following: type of MPI function call, origin and destination node, data type transmitted/received, size of data transmitted/received, other MPI function arguments, and time of MPI function call.

10. The apparatus of claim 6, wherein the trace communication data used to calculate the processor load for each node in the parallel computing system includes time information for each transmission in inter-node communication.

11. A processor-readable storage medium having stored thereon instructions that, if executed by a processor, cause the processor to perform a method comprising:
    intercepting trace communication data from an instance of an application running on a parallel computing system comprising a plurality of nodes;
    calculating the processor load for each node in the parallel computing system on a time axis from the trace communication data;
    generating computer instructions to simulate the processor load of the application for each node on the time axis;
    generating computer instructions to simulate the communication pattern of the application between the nodes on the time axis;
    storing the trace communication data in a computer readable medium; and
    compiling the computer instructions to simulate the processor load and the computer instructions to simulate the communication pattern into the synthetic kernel.

12. The processor-readable storage medium of claim 11, wherein the trace communication data used to calculate the processor load for each node in the parallel computing system includes time information for each transmission in inter-node communication.

* * * * *